United States Patent
Friehmelt et al.

(10) Patent No.: US 8,252,853 B2
(45) Date of Patent: Aug. 28, 2012

(54) PROCESS FOR PREPARATION OF RUBBER MIXTURES CONTAINING SILICON DIOXIDE

(75) Inventors: Rainer Friehmelt, Köln (DE); Joachim Fröhlich, Bornheim (DE); Werner Niedermeier, Brühl (DE); Ralph Hofmann, Buchen (DE); Uwe Schachtely, Kahl am Main (DE)

(73) Assignee: Evonik Degussa GmbH, Essen (DE)

( * ) Notice: Subject to any disclaimer, the term of this patent is extended or adjusted under 35 U.S.C. 154(b) by 210 days.

(21) Appl. No.: 12/086,307

(22) PCT Filed: Jan. 2, 2007

(86) PCT No.: PCT/EP2007/050013
§ 371 (c)(1),
(2), (4) Date: Aug. 18, 2009

(87) PCT Pub. No.: WO2007/085503
PCT Pub. Date: Aug. 2, 2007

(65) Prior Publication Data
US 2010/0010116 A1    Jan. 14, 2010

(30) Foreign Application Priority Data
Jan. 25, 2006   (EP) .................................. 06100823

(51) Int. Cl.
*C08J 11/00* (2006.01)
(52) U.S. Cl. .................... 523/150; 423/335; 423/337
(58) Field of Classification Search .................. 523/150
See application file for complete search history.

(56) References Cited

U.S. PATENT DOCUMENTS

| | | | | |
|---|---|---|---|---|
| 4,077,885 A | * | 3/1978 | van Heuven et al. | 210/193 |
| 4,877,595 A | * | 10/1989 | Klingle et al. | 423/335 |
| 5,342,597 A | * | 8/1994 | Tunison, III | 423/335 |
| 5,591,797 A | * | 1/1997 | Barthel et al. | 524/493 |
| 6,752,864 B2 | * | 6/2004 | Meyer et al. | 106/483 |
| 7,842,269 B2 | * | 11/2010 | Schachtely et al. | 523/150 |
| 2004/0024070 A1 | | 2/2004 | Michael et al. | |

FOREIGN PATENT DOCUMENTS

| | | |
|---|---|---|
| DE | 1 129 459 B | 5/1962 |
| DE | 1 807 714 B1 | 6/1970 |
| DE | 3238427 * | 4/1984 |
| DE | 37 41 846 A1 | 1/1989 |
| DE | 40 29 158 A1 | 3/1992 |
| DE | 199 36 478 A1 | 2/2001 |
| DE | 199 61 933 A1 | 7/2001 |
| DE | 103 56 042 A1 | 7/2005 |
| EP | 1 541 525 A1 | 6/2005 |
| WO | WO 01/07364 A1 | 2/2001 |

OTHER PUBLICATIONS

Derwent abstract of DE 32 38 427, 1992.*
PCT International Preliminary Report on Patentability (Chapter I of the PCT), Aug. 7, 2008, Evonik Degussa GmbH et al.

* cited by examiner

*Primary Examiner* — Doris Lee
(74) *Attorney, Agent, or Firm* — Smith, Gambrell & Russell, LLP

(57) ABSTRACT

Rubber mixtures are prepared by using, alongside the other constituents, pyrogenically prepared silicon dioxide in the form of crusts whose tamped bulk density (to DIN EN ISO 787-11) is from 185 to 700 g/l.

6 Claims, 8 Drawing Sheets

Diagram of dust sedimentation tester

Comparison of sedimentation curves of the two specimens in the vertical pipe

Sample H: Inventive crusts

Sample J: Subject to preliminary bulk-density increase according to EP 0 280 851

PROCESS FOR PREPARATION OF RUBBER MIXTURES CONTAINING SILICON DIOXIDE

CROSS-REFERENCE TO RELATED APPLICATIONS

This application is the national stage under 35 U.S.C. §371 of PCT/EP2007/050013 filed Jan. 2, 2007.

The invention relates to a process for preparation of rubber mixtures.

Rubber mixtures are widely used. The best-known process uses rubber mixtures for production of tires. These tire rubber mixtures comprise, alongside various rubber components, reinforcing fillers, such as carbon black and/or amorphous silicon dioxide.

The amorphous silicon dioxide used comprises mainly precipitated silica. Alongside this, pyrogenically prepared silicon dioxide is also used.

By way of example, U.S. Pat. No. 6,455,613 B1 discloses use of pyrogenically prepared silicon dioxide in tire rubber mixtures. The bulk density of this pyrogenically prepared silicon dioxide is from 40 to 60 g/l (pour density, ASTM D1513).

Use of pyrogenically prepared silicon dioxide together with a silane coupling agent in the rubber mixtures is known (U.S. Pat. Nos. 5,430,087 and 5,294,253).

A disadvantage of the known processes is that the pyrogenically prepared silicon dioxide is used in powder form and therefore dust contamination has to be considered. Because the bulk density is low, furthermore, a plurality of steps is needed for addition of the pulverulent, pyrogenically prepared silicon dioxide, the result being an increase in mixing time. Known processes in which the bulk density is increased and dust contamination is reduced can impair dispersibility. Other processes involving an increase in bulk density cannot simultaneously avoid dust contamination.

The object of the invention is to develop a process for preparation of rubber mixtures in which these disadvantages do not occur.

The invention provides a process for preparation of rubber mixtures by admixing pyrogenically prepared silicon dioxide alongside other constituents, characterized in that the pyrogenically prepared silicon dioxide is used in the form of crusts whose tamped bulk density (to DIN EN ISO 787-11) is from 185 to 700 g/l.

The tamped bulk density can be from 191 to 700 g/l, preferably from 200 to 700 g/l.

In one particularly preferred embodiment of the invention, the tamped bulk density of the crusts (to DIN EN ISO 787-11) can be from 200 to 450 g/l.

According to the invention, the tamped bulk density of a hydrophilic pyrogenically prepared silicon dioxide compacted to give crusts can preferably be from 191 to 700, in particular from 200 to 700, and also from 200 to 450 g/l.

The tamped bulk density of a hydrophobic pyrogenically prepared silicon dioxide compacted to give crusts can be from 210 to 700 g/l, preferably from 210 to 700 g/l, especially preferred from 210 to 450 g/l.

Crusts is the term used for the somewhat strip-like intermediate products which are produced by pressure on the starting material during roll compacting. They are comminuted in a second step.

The properties of the crusts can be influenced via the process variables, e.g. the process control system provided, the compacting force, the width of the gap between the two rolls and the pressure retention time, which is adjusted via an appropriate alteration in the rotation rates of the compression rolls.

Compacting means achievement of a bulk-density increase by mechanical means without addition of binders. In one particular embodiment of the invention, the crusts have a clearly defined shape, and the size distribution here can be adjusted by means of sieving.

The inventively used pyrogenically prepared silicon dioxide compacted to give crusts is very stable during transport.

In the production of the crusts used according to the invention and composed of pyrogenically prepared silicon dioxide whose tamped bulk density (to DIN EN ISO 787-11) is from 185 to 700 g/l, pyrogenically prepared silicon dioxide is subject to preliminary de-aeration and, respectively, to preliminary bulk-density increase, and is compacted to give crusts, and the crusts are broken and, if appropriate, classified.

A BRIEF DESCRIPTION OF THE DRAWINGS

Figure 1:
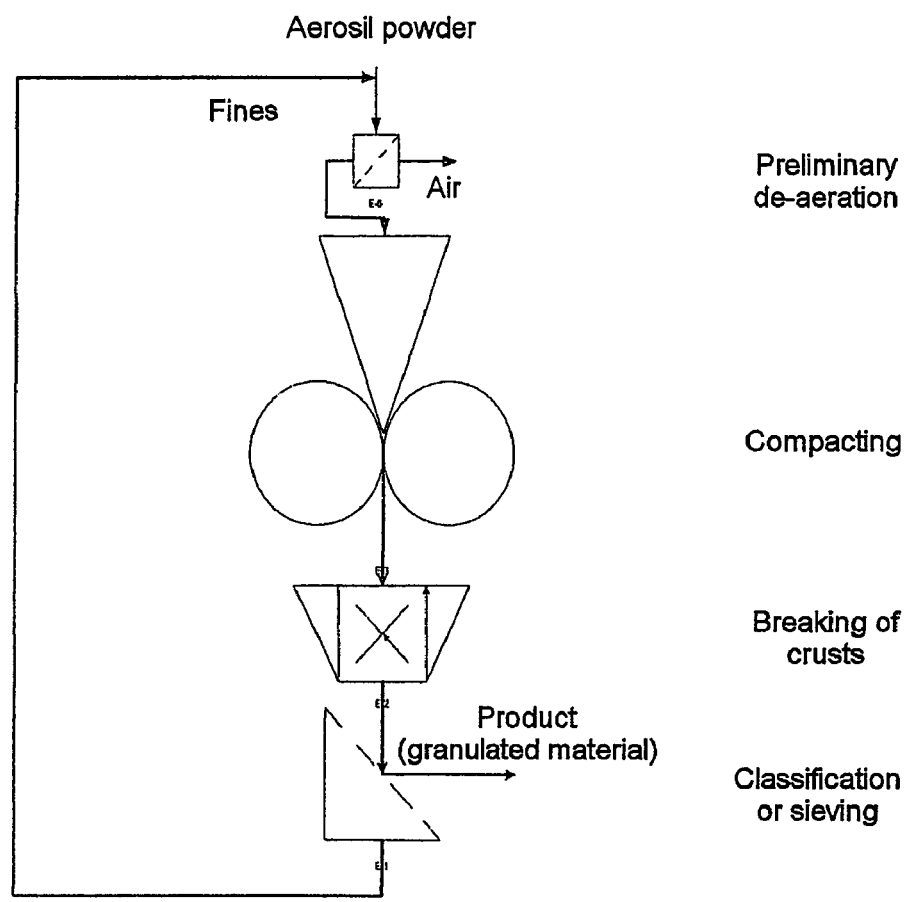
FIG. 1 is a diagram of the process.

According to FIG. 1, the pyrogenically prepared silicon dioxide is subject to preliminary bulk-density increase or is de-aerated by means of known methods and apparatuses in the "preliminary de-aeration" step. This step is needed if pyrogenically prepared silicon dioxide is used which is not subject to bulk-density increase, possibly having been freshly prepared.

If a pyrogenically prepared silicon dioxide is used which has been previously subject to preliminary bulk-density increase, this preliminary de-aeration step can be omitted.

The pyrogenically prepared silicon dioxide which has been subject to preliminary de-aeration is subject to bulk-density increase (compacted) to the desired tamped bulk density in the "compacting" step.

After compacting, the crusts are broken. Classification or sieving can then be carried out, if appropriate.

The fines produced during sieving can be returned to the preliminary de-aeration step.

The starting material for preliminary de-aeration can comprise a silicon dioxide which has not been subject to bulk-density increase, or which has been subject to preliminary bulk-density increase.

The preliminary de-aeration process can be carried out prior to transport or during transport to the compacting process.

Prior to transport to the compacting process, the preliminary de-aeration process can be carried out by means of a pipe to which vacuum is applied and which is composed of a sintered material, e.g. sintered metal.

The preliminary de-aeration process can moreover be carried out in the transport screw, and the transport screw here may be downstream of the apparatus which encompasses a pipe to which vacuum is applied.

In another embodiment of the invention, the transport screw can be used as the sole apparatus for the preliminary de-aeration process.

The preliminary de-aeration process can moreover be carried out by means of a transport screw arranged within a pipe to which vacuum is applied. The pipe to which vacuum is applied can be composed of a sintered material, e.g. sintered metal.

If the apparatus is composed of a preliminary de-aeration pipe, e.g. of a pipe to which vacuum is applied, and of a downstream transport screw, the preliminary de-aeration process can be carried out in the pipe, if a silicon dioxide is used which has not been subject to bulk-density increase.

If a silicon dioxide which has been subject to preliminary bulk-density increase is used, the preliminary de-aeration process can likewise be carried out in the pipe. It is also possible to omit this preliminary de-aeration step.

If exclusively the transport screw is used for the preliminary de-aeration process, it is necessary to use silicon dioxide which has been subject to preliminary bulk-density increase.

If the preliminary de-aeration process uses the apparatus which has a transport screw within a pipe to which vacuum is applied, it is possible to use either silicon dioxide which has not been subject to bulk-density increase or else silicon dioxide which has been subject to preliminary bulk-density increase.

The preliminary de-aeration of the pyrogenically prepared silicon dioxide can moreover take place by means of filtration on a filter medium, e.g. a cloth or sintered material, e.g. sintered metal, sintered plastic, sintered ceramic, porous glass, with continuous filtercake removal via, for example, a conveying screw or a scraper. In one embodiment, a sintered metal pipe can be used with a metering screw.

The preliminary de-aeration can moreover take place by means of sedimentation, where the break-up of solid bridges is promoted via additional use of vibration or sound or via slow stirring.

The starting material used can be a hydrophilic, pyrogenically prepared silicon dioxide or a hydrophobic, pyrogenically prepared silicon dioxide.

The hydrophobic pyrogenically prepared silicon dioxide can be prepared by means of surface modification.

One or more compounds from the following group can be used for the surface modification process:

a) organosilanes of the type $(RO)_3Si(C_nH_{2n+1})$ and $(RO)_3Si(C_nH_{2n-1})$
   R=alkyl, e.g. methyl, ethyl, n-propyl, iso-propyl, butyl
   n=from 1 to 20 b) organosilanes of the type $R'_x(RO)_ySi(C_nH_{2n+1})$ and $R'_x(RO)_ySi(C_nH_{2n-1})$
   R=alkyl, e.g. methyl, ethyl, n-propyl, iso-propyl, butyl
   R'=alkyl, e.g. methyl, ethyl, n-propyl, iso-propyl, butyl
   R'=cycloalkyl
   n=from 1 to 20
   x+y=3
   x=1, 2
   y=1, 2 c) haloorganosilanes of the type $X_3Si(C_nH_{2n+1})$ and $X_3Si(C_nH_{2n-1})$
   X=Cl, Br
   n=from 1 to 20 d) haloorganosilanes of the type $X_2(R')Si(C_nH_{2n+1})$ and $X_2(R')Si(C_nH_{2n-1})$
   X=Cl, Br
   R'=alkyl, e.g. methyl, ethyl, n-propyl, iso-propyl, butyl
   R'=cycloalkyl
   n=from 1 to 20 e) haloorganosilanes of the type $X(R')_2Si(C_nH_{2n+1})$ and $X(R')_2Si(C_nH_{2n-1})$
   X=Cl, Br
   R'=alkyl, e.g. methyl, ethyl, n-propyl, iso-propyl, butyl
   R'=cycloalkyl
   n=from 1 to 20 f) organosilanes of the type $(RO)_3Si(CH_2)_m$—R'
   R=alkyl, e.g. methyl, ethyl, propyl
   m=0, from 1 to 20
   R=methyl, aryl (e.g. —$C_6H_5$, substituted phenyl radicals)
   —$C_4F_9$, —$OCF_2$—$CHF$—$CF_3$, —$C_6F_{13}$, —O—$CF_2$—$CHF_2$—$NH_2$, —$N_3$, —SCN, —CH=$CH_2$, —NH—$CH_2$—$CH_2$—$NH_2$,
   —N—$(CH_2$—$CH_2$—$NH_2)_2$
   —OOC$(CH_3)$C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si—$(OR)_3$
   —$S_x$—$(CH_2)_3$Si$(OR)_3$, where X=from 1 to 10 and R can be alkyl, e.g. methyl, ethyl, propyl, butyl
   —SH
   —NR'R''R''' (R'=alkyl, aryl; R''=H, alkyl, aryl; R'''=H, alkyl, aryl, benzyl, $C_2H_4NR''''R'''''$, where R''''=A, alkyl and R'''''=H, alkyl)

g) organosilanes of the type $(R'')_x(RO)_ySi(CH_2)_m$—R'
   R''=alkyl x+y=2
   =cycloalkyl x=1, 2
   y=1, 2
   m=0, from 1 to 20
   R'=methyl, aryl (e.g. —$C_6H_5$, substituted phenyl radicals)
   —$C_4F_9$, —$OCF_2$—CHF—$CF_3$, —$C_6F_{13}$, —O—$CF_2$—$CHF_2$,
   —$NH_2$, —$N_3$, —SCN, —CH=$CH_2$, —NH—$CH_2$—$CH_2$—$NH_2$,
   —N—$(CH_2$—$CH_2$—$NH_2)_2$
   —OOC$(CH_3)$C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si—$(OR)_3$
   —$S_x$—$(CH_2)_3$Si$(OR)_3$, where X=from 1 to 10 and R can be methyl, ethyl, propyl, butyl
   —SH—NR'R''R''' (R'=alkyl, aryl; R''=H, alkyl, aryl; R'''=H, alkyl, aryl, benzyl, $C_2H_4NR''''R'''''$, where R''''=A, alkyl and R'''''=H, alkyl)

h) haloorganosilanes of the type $X_3Si(CH_2)_m$—R'
   X=Cl, Br
   m=0, from 1 to 20
   R=methyl, aryl (e.g. —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$,
   —NH—$CH_2$—$CH_2$—$NH_2$
   —N—$(CH_2$—$CH_2$—$NH_2)_2$
   —OOC$(CH_3)$C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si—$(OR)_3$ —$S_x$—$(CH_2)_3Si(OR)_3$, where X=from 1 to 10 and R can be methyl, ethyl, propyl, butyl
—SH
i) haloorganosilanes of the type $(R)X_2Si(CH_2)_m$—R'
X=Cl, Br
R=alkyl, e.g. methyl, ethyl, propyl
m=0, from 1 to 20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—$(CH_2$—$CH_2$—$NH_2)_2$
—$OOC(CH_3)C$=$CH_2$
—$OCH_2$—CH(O)$CH_2$
—NH—CO—N—CO—$(CH_2)_5$
—NH—COO—$CH_3$, —NH—COO—$CH_2$—$CH_3$,
—NH—$(CH_2)_3$Si—$(OR)_3$,
where R can be methyl, ethyl, propyl, butyl —$S_x$—$(CH_2)_3$Si $(OR)_3$, where R can be methyl, ethyl, propyl, butyl and X can be from 1 to 10
—SH
j) haloorganosilanes of the type $(R)_2XSi(CH_2)_m$—R'
X=Cl, Br
R=alkyl, e.g. methyl, ethyl, propyl, butyl
m=0, from 1 to 20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—$(CH_2$—$CH_2$—$NH_2)_2$
—$OOC(CH_3)C$=$CH_2$
—$OCH_2$—CH(O)$CH_2$
—NH—CO—N—CO—$(CH_2)_5$
—NH—COO—$CH_3$, —NH—COO—$CH_2$—$CH_3$,
—NH—$(CH_2)_3$Si—$(OR)_3$
—$S_x$—$(CH_2)_3Si(OR)_3$, where X=from 1 to 10 and R can be methyl, ethyl, propyl, butyl
—SH
k) silazanes of the type $R'R_2Si$—N—$SiR_2R'$
|
H R=alkyl
R'=alkyl, vinyl
l) cyclic polysiloxanes of the type D 3, D 4, D 5, where D 3, D 4 and D 5 are cyclic polysiloxanes having 3, 4 or 5 units of the type —O—$Si(CH_3)_2$—. For example, octamethylcyclotetrasiloxane=D 4 m) polysiloxanes or silicone oils of the type
m=0, 1, 2, 3, . . . ∞
n=0, 1, 2, 3, . . . ∞
u=0, 1, 2, 3, . . . ∞

Y=$CH_3$, H, $C_nH_{2n+1}$ n=1-20
Y=$Si(CH_3)_3$, $Si(CH_3)_2H$
$Si(CH_3)_2OH$, $Si(CH_3)_2(OCH_3)$
$Si(CH_3)_2(C_nH_{2n+1})$ n=1-20
R=alkyl, e.g. $C_nH_{2n+1}$, where n=from 1 to 20, aryl, e.g.
phenyl and substituted phenyl radicals, $(CH_2)_n$—$NH_2$, H
R'=alkyl, e.g. $C_nH_{2n+1}$, where n=from 1 to 20, aryl, e.g.
phenyl and substituted phenyl radicals, $(CH_2)_n$—$NH_2$, H
R''=alkyl, e.g. $C_nH_{2n+1}$, where n=from 1 to 20, aryl, e.g.
phenyl and substituted phenyl radicals, $(CH_2)_n$—$NH_2$, H
R'''=alkyl, e.g. $C_nH_{2n+1}$, where n=from 1 to 20, aryl, e.g.
phenyl and substituted phenyl radicals, $(CH_2)_n$—$NH_2$, H.

In one embodiment, the starting material used can comprise a pyrogenically prepared silicon dioxide subject to preliminary bulk-density increase.

When the pyrogenically prepared silicon dioxide used is not subject to bulk-density increase its tamped bulk density (to DIN EN ISO 787-11) can be smaller than 50 g/l, preferably from 20 to 30 g/l. The pyrogenically prepared silicon dioxide used which is subject to preliminary bulk-density increase can have a tamped bulk density (to DIN EN ISO 787-11) of from 50 to 190 g/l, preferably from 100 to 150 g/l, and the tamped bulk density here (to DIN EN ISO 787-11) of a hydrophobic pyrogenically prepared silicon dioxide subject to preliminary bulk-density increase can be from 90 to 120 g/l.

In the state not subject to bulk-density increase, the hydrophilic silicon dioxide used can have a tamped bulk density (to DIN EN ISO 787-11) smaller than 50 g/l, preferably from 20 to 30 g/l.

In the state subject to preliminary bulk-density increase, the hydrophilic silicon dioxide can have a tamped bulk density (to DIN EN ISO 787-11) of from 50 to 190 g/l, preferably from 100 to 150 g/l.

In the state subject to preliminary bulk-density increase, the hydrophobic silicon dioxide can have a tamped bulk density (to DIN EN ISO 787-11) of from 50 to 190 g/l, preferably from 90 to 120 g/l.

The primary particle size of the pyrogenically prepared silicon dioxide used can be from 5 to 50 nm and its BET surface area can be from 40 to 400 m²/g, preferably from 100 to 250 m²/g.

The water content of the pyrogenically prepared silicon dioxide used can be smaller than 1% by weight.

The pyrogenically prepared silicon dioxide can be subject to preliminary bulk-density increase by means of known processes and apparatuses. By way of example, the apparatuses according to U.S. Pat. Nos. 4,325,686, 4,877,595, 03,838, 785, 3,742,566, 3,762,851, 3,860,682 can be used.

It is moreover possible to use a pyrogenically prepared silicon dioxide subject to preliminary bulk-density increase by means of a pressure-belt filter according to EP 0280851 B1 or U.S. Pat. No. 4,877,595.

By way of example, the transport of the pyrogenically prepared silicon dioxide to the compacting process can take place by means of a screw.

This transport consists in forcing the pyrogenically prepared silicon dioxide into the nip of the compacting rolls. If a conveying screw is not used, it is necessary to use a pyrogenically prepared silicon dioxide which has been subject to preliminary bulk-density increase.

If a conveying screw is used, the pyrogenically prepared silicon dioxide may not be subject to preliminary bulk-density increase, because preliminary de-aeration takes place here.

In order to achieve high bulk densities of the crusts, it is possible to use a conveying screw and a pyrogenically prepared silicon dioxide subject to preliminary bulk-density increase.

The conveying screw used can comprise a screw with decreasing volume or with increasing pitch or with decreasing diameter.

Surrounding the conveying screw there can be a pipe to which vacuum is applied. This pipe can be composed of a sintered jacket. The preliminary de-aeration of the silicon dioxide takes place here in the transport screw simultaneously with the transport into the nip.

Compacting to give crusts can take place by means of two rolls, of which one, or else both simultaneously, can have a de-aerating function.

It is preferable to use two compacting rolls, which can be smooth. They can also have a profile. The profile can be present either only on one compacting roll or else on both compacting rolls.

The profile can be composed of grooves parallel to the axis. As an alternative, it can be composed of recesses (depressions) of any desired shape, arranged in any desired manner.

In another embodiment of the invention, at least one of the rolls can be a vacuum roll. In this embodiment, the roll can have been covered with sintered metal.

In order to bring about the de-aeration function, the roll can have been produced from sintered metal or can have been covered with a filter medium, for example with a cloth.

If de-aeration of the pyrogenically prepared silicon dioxide is possible by means of the rolls, it is possible to omit the additional preliminary de-aeration which can take place in the conveying screw or in the feed pipe.

If the roll is used for preliminary de-aeration, the roll can have a smooth or profiled surface, and this surface can be only slightly grooved, in order to improve take-up of the product.

The compacting process should ensure uniform compression of the pyrogenically prepared silicon dioxide, in order to give crusts with uniform density.

Figure 2:
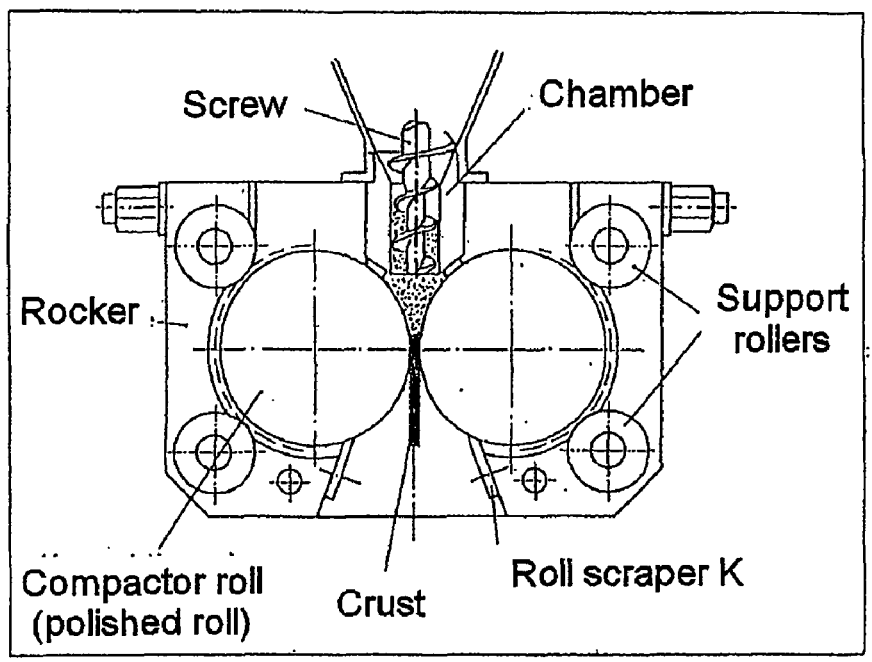
FIG. 2 shows an apparatus for carrying out the compacting process.

Apparatus as shown in FIG. 2 can be used to carry out the compacting process.

According to FIG. 2, the pyrogenically prepared silicon dioxide is introduced by means of the screw 1 into the chamber 2 between the two rolls 3 and is pressed between the two rolls to give crusts.

The process can moreover be carried out by using an apparatus as described in the document DE B 1807714.

It is preferable to use smooth rolls in the compacting process, in order to avoid grit. It is moreover possible to use one or two rolls composed of sintered material, e.g. sintered metal or sintered ceramic, by way of which de-aeration can take place.

After the compacting process, the crusts are broken. A sieving granulator can be used for this purpose, and its sieve mesh width prescribes the grain size. The mesh width can be from 250 µm to 20 mm.

For breaking of the crusts it is moreover possible to use an apparatus with two counter-rotating rolls with a defined gap, or a toothed roll.

The broken crusts can be classified by means of a sifter, a sieve or a classifier. The fines (particles smaller than 200 µm) can thereby be removed.

Sifters that can be used are cross-flow sifters, countercurrent baffle-type sifters, etc.

A cyclone can be used as classifier.

The fines (particles smaller than 200 µm) removed during classification can be returned to the process.

Determination of Tamped Bulk Density

Tamped bulk density was measured to DIN EN ISO 787-11. Prior to the measurements, the specimens were passed through a 5 mm sieve in order to break up large agglomerates and obtain reproducible measurements.

Determination of Dust Content

Dust content is determined to DIN 55992-2.

The comparative pyrogenic silica products subject to bulk-density increase by the apparatus according to EP 0 280 851 A1, and the inventive crusts, were passed through a 5 mm sieve prior to the measurements, in order to break up large agglomerates and obtain reproducible measurements.

Figure 3:
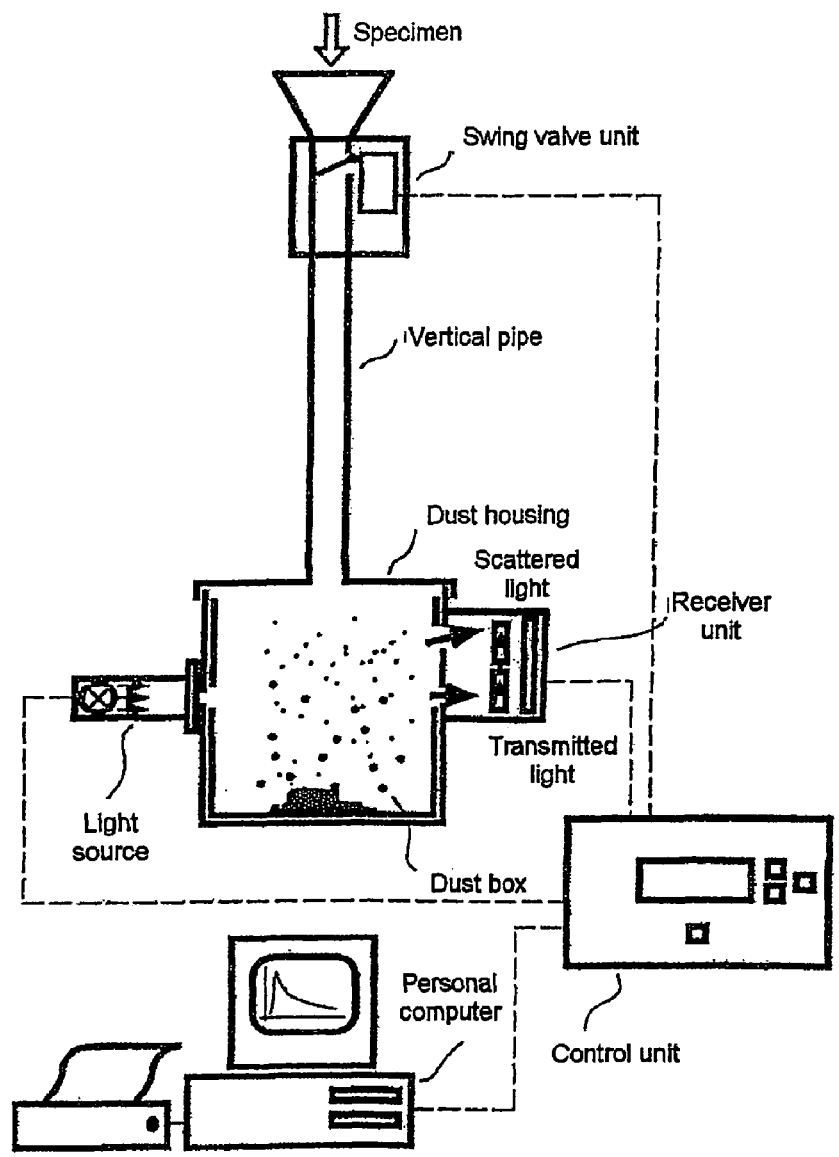
FIG. 3 shows a diagram of the test device for the determination of dust content.

FIG. 3 shows a diagram of the test device for determination of dust content.

To determine dust content, a weighed-out amount (3 g) of the inventive crusts or of the comparative product according to EP 0 280 851 A1 is charged to a feed system at the upper end of the vertical pipe. This has been sealed below by flaps prior to the start of the test. The end of the vertical pipe has been sealed. At the start of the test, this flap is opened for a certain period so that the specimen can drop into the vertical pipe. The specimen dissipates dust into the air during the drop and on impact on the base of the vertical pipe. Air turbulence during the drop provides uniform distribution of the dust in the pipe. Sedimentation of the suspended materials then begins. The light extinction brought about by the suspended material at the lower end of the vertical pipe is measured via a photometric sensor. The sedimentation curve is indicated by a PC as extinction as a function of time. Extinction is a measure of relative particle concentration.

From the curve of extinction as a function of time it is possible to determine the cumulative dust values. The cumulative dust values are determined as follows from the sedimentation curve measured from an initial time ta to the end of the test after 30 s:

$$I(ta) = \int_{ta}^{30s} E(t)\,dt \text{ where } ta = 1\text{ s}, 2\text{ s}, 4\text{ s}, 8\text{ s}, 16\text{ s} \quad (1)$$

These cumulative dust values describe the amount of dust liberated. The cumulative dust value from 16 s to 30 s is also termed the "dust value". It contains information on fine dust or is a measure of fine dust content.

The cumulative dust value from 1 s to 30 s describes the total amount of dust, composed of coarse dust and fine dust.

The inventive crusts of a pyrogenic silica differ in these two values from pyrogenic silica subject to bulk-density increase by an apparatus according to EP 0 280 851 A1.

EXAMPLE

Comparison of the dust performance of pyrogenic silica subject to bulk-density increase in an apparatus according to EP 0 280 851 A1 with the inventive crusts of a pyrogenic silica. The BET surface area of both specimens is 150 m²/g.

Figure 7:
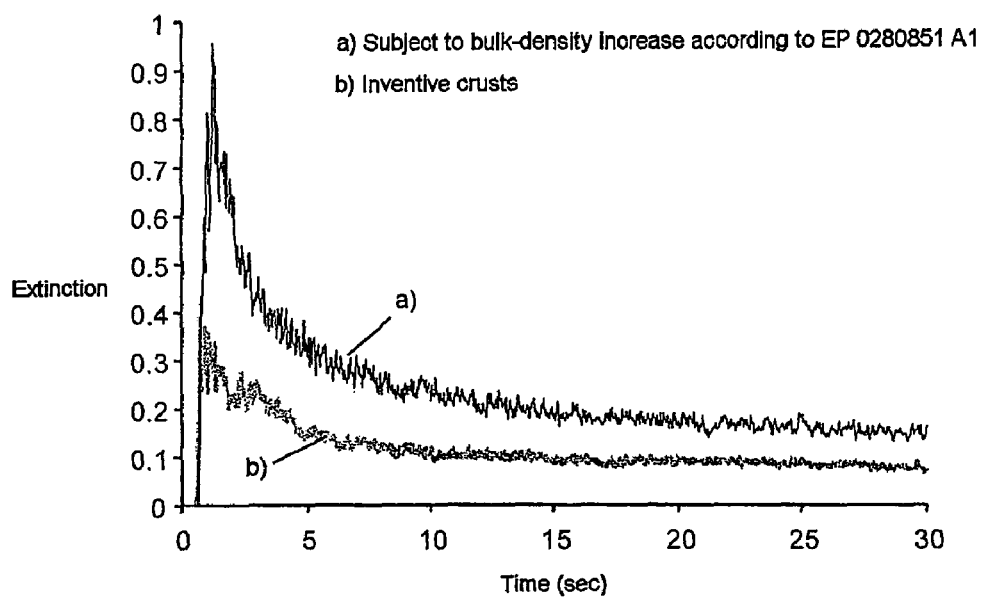
FIG. 7 shows the curve of extinction as a function of time or of relative dust concentration during the determination for two specimens.

FIG. 7 shows the curve of extinction as a function of time or of relative dust concentration during the determination described above of dust content of the two specimens. This curve shows that the inventive compactates sediment substantially more rapidly and that after 16 s there is less fine dust remaining in suspension than with pyrogenic silica subject to bulk-density increase according to EP 0 280 851 A1. Over the entire duration of the test, the inventive crusts liberate substantially less dust than does the pyrogenic silica subject to bulk-density increase according to EP 0 280 851 A1. Extinction assumes markedly lower numeric values in FIG. 7 for the inventive crusts.

TABLE 1

Comparison of total dust contents and fine dust contents
(dust values = cumulative dust value from
1 s to 30 s and from 16 s to 30 s)

| | Dust value* I (1 s) (from eq. 1) [rel. conc. * s] | Dust value* I (16 s) (from eq. 1) [rel. conc. * s] |
|---|---|---|
| Pyrogenic silica, subject to bulk-density increase by apparatus according to EP 0 280 851 A1 | 207 | 62 |
| Inventive crusts of a pyrogenic silica | 113 | 40 |

*The statistical independence of the dust values of the two experimental products was demonstrated via the T test. 12 replicating experiments were carried out from each specimen.

The cumulative dust values in the determination described above of dust contents differ markedly from one another. Firstly, pyrogenic silica subject to bulk-density increase according to EP 0 280 851 A1 generates, with a I(1 s) value of 207, significantly more coarse and fine dust than the inventive crusts with a I(1 s) value of 113. Furthermore, the crusts have a fine dust value (I(16 s)) of 40, whereas pyrogenic silica subject to bulk-density increase by an apparatus according to EP 0 280 851 A1 has a substantially higher dust value: 62. That means that the inventive compacting process to give crusts can significantly reduce not only the total dust content but also the fine dust content when comparison is made with bulk-density increase according to EP 0 280 851 A1.

Figure 4:
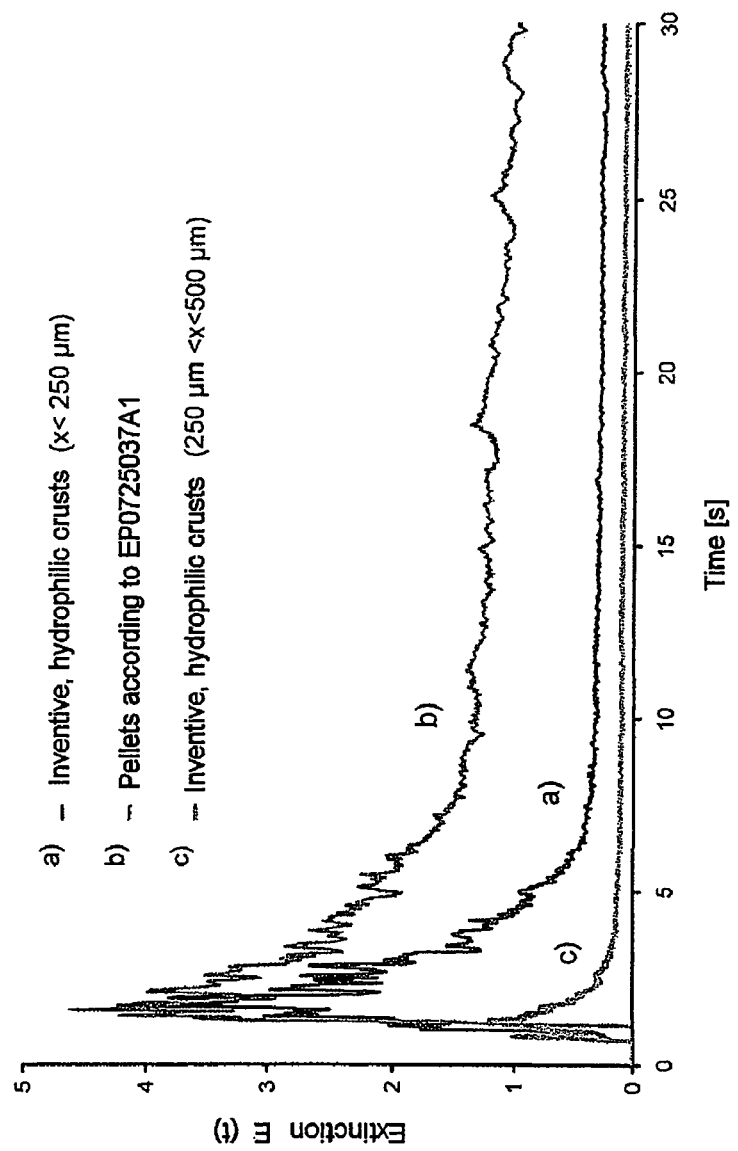
FIG. 4 shows a comparison of the fine dust content of the pyrogenically prepared silicon dioxide compacted to give crusts and the fine dust contents of pyrogenic silicon dioxide subject to bulk-density increase in a known manner.

FIG. 4 compares the fine dust content of the pyrogenically prepared silicon dioxide compacted to give crusts and the fine dust contents of pyrogenic silicon dioxide subject to bulk-density increase in a known manner.

Starting materials used for the process for producing the crusts comprise a pyrogenically prepared silicon dioxide subject to bulk-density increase by means of the pressure-belt filter according to EP 0 280 851 B1.

FIG. 4 shows a measure of the particle size distribution and the average particle size of the loose powder and, respectively, of the loose crusts. It is apparent here that the crusts used according to the invention and composed of the pyrogenically prepared silicon dioxide sediment significantly better and generate significantly less dust than the granulated material according to EP 0 725 037 A1.

FIG. 4 moreover shows a measure of content of fine or suspended dust. It is apparent here that the content of suspended dust can be drastically reduced for the crusts used according to the invention. In the case of granulated material according to EP 0 725 037 A1, a large proportion remains suspended for a very long time.

Figure 5:
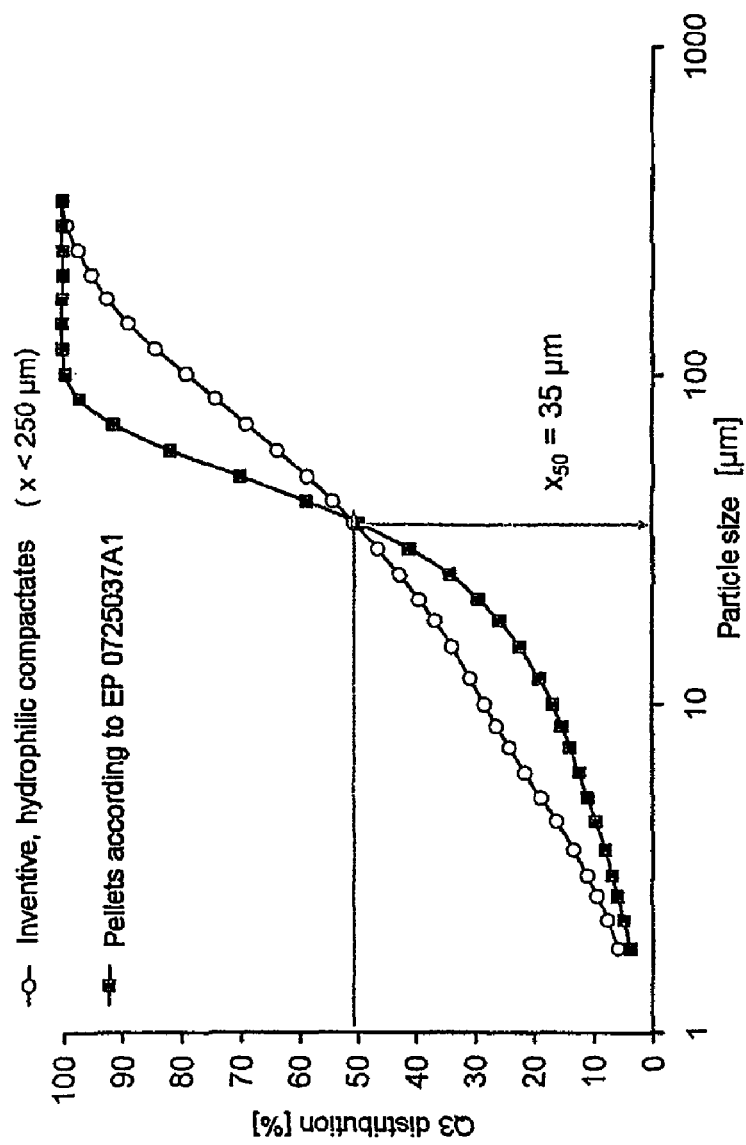
FIG. 5 shows the cumulative distribution (Q-3 distribution) of granulated materials according to EP 0 725 037 A1 and according to the invention.

FIG. 5 shows the cumulative distribution (Q-3 distribution) of granulated materials according to EP 0 725 037 A1 and according to the invention.

The crusts used according to the invention where X<250 μm have the same average particle size in laser diffraction spectroscopy as the granulated material according to EP 0 725 037 A1. In both cases it is ~35 μm.

The crusts used according to the invention generate significantly less dust, however.

The fractions of the crusts were prepared via sieving granulation using a sieve of mesh width 500 μm and subsequent sieving on a 250 μm sieve. The fraction x<250 μm was the fine product in the sieving process. The fraction whose particle size was from 250 to 500 μm was the coarse product.

Figure 6:
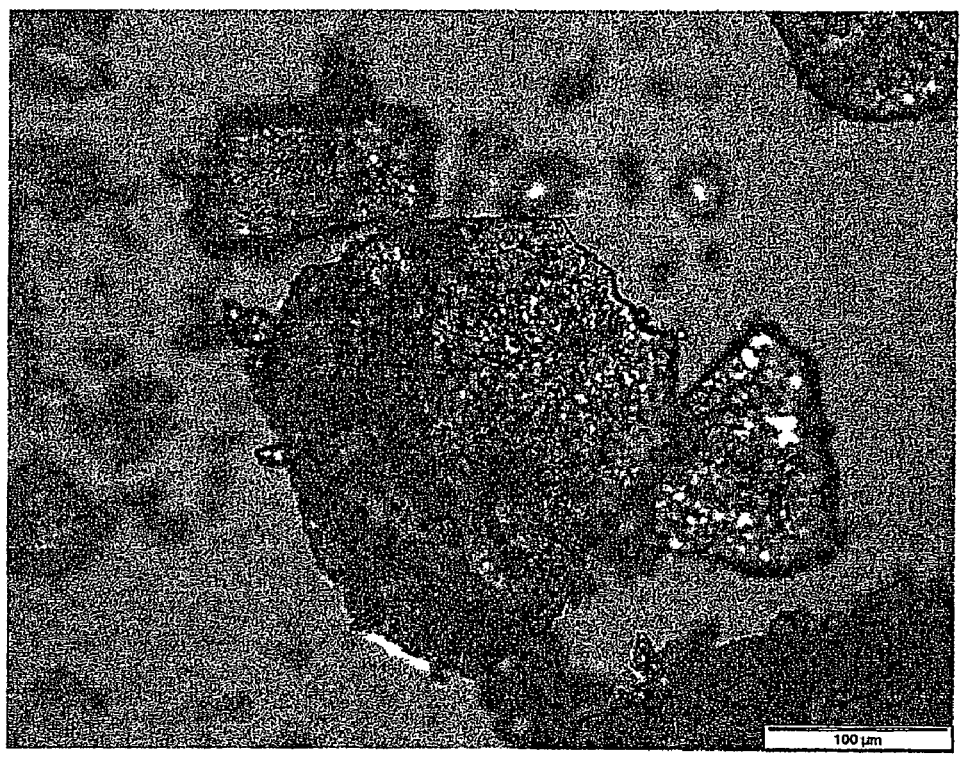
FIG. 6 shows the granulated form after breaking and sieving of the pyrogenically prepared silicon dioxide compacted to give crusts.

FIG. 6 shows the granulated form after breaking and sieving of the pyrogenically prepared silicon dioxide compacted to give crusts and used according to the invention. It has an angled shape.

The granulated materials according to DE 19601415 have spherical appearance.

In one preferred embodiment of the invention, the tamped bulk density (to DIN EN ISO 787-11) of the crusts obtained is from 210 to 450 g/l. These crusts then have the necessary strength not to break apart again in the subsequent steps. However, they can be dispersed again readily.

The crusts obtained are moreover porous.

The crusts used according to the invention have an advantageously low dust content after breaking, even without sieving or classification.

The agglomerate hardness of the crusts used according to the invention is smaller than 50N, measured by ERWEKA 30.

The pyrogenically prepared silicon dioxide compacted to give crusts has, after sieving, no fines content with diameter smaller than 200 μm.

The pyrogenically prepared silicon dioxide compacted to give crusts and used according to the invention has a low dust level which is advantageous for all applications. It can be incorporated in mixtures without losses and without dust contamination.

Although the pyrogenically prepared silicon dioxide has been compacted, the inventive crusts have adequate redispersibility in rubber mixtures. But the redispersibility is not sufficient for silicon rubber.

The pyrogenically prepared silicon dioxide compacted according to the invention to give crusts comprises no binder.

The use of silicas as reinforcing filler in the type of rubber mixtures used inter alia for production of pneumatic tires and of technical rubber items is subject to stringent requirements. The materials are intended to be lightweight and capable of good incorporation and dispersion within the rubber and of undergoing, in conjunction with a coupling reagent, preferably a bifunctional organosilicon compound, a chemical reaction with the rubber which leads to the desired high level of reinforcement of the rubber mixture. The reinforcing property can in particular be associated with high static stress values and a low abrasion value. Particular factors of decisive importance for the reinforcing property of silicas are the particle size, their surface and morphology, surface activity, and also the capability for binding of the coupling reagent.

Another factor known to the person skilled in the art is that low-molecular-weight compounds, e.g. the bifunctional organosilicon compounds and vulcanization accelerators, can be involved in physi- and chemisorption processes in the pores of the microporous silica, the result being only limited residual capability for exerting their function as rubber coupling agents or vulcanization accelerators for the crosslinking of the rubber.

Another factor known to the person skilled in the art is that the coupling reagent, usually a bifunctional organosilicon compound known from, for example, S. Wolff "Chemical Aspects of Rubber Reinforcement by Fillers", Rubber Chem. Technol. 69, 325 (1996), is intended to maximize the homogeneity and quantitativeness of modification of the surface having activity with respect to the rubber. The modification can take place via precoating of the bulk silica or in solution/suspension (ex-situ) (U. Görl, R. Panenka, "Silanisierte Kieselsäuren—Eine neue Produktklasse für zeitgemäβe Mischungsentwicklung", Kautsch. Gummi Kunstst. 46, 538 (1993)) [Silanized silicas—a new class of product for contemporary mixture development], or else during the mixing process (in-situ) (H.-D. Luginsland, "Processing of silica/silane-filled tread compounds", paper No. 34 presented at the ACS Meeting, Apr. 4-6, 2000, Dallas, Tex./USA), in-situ modification being the process that is preferable and is also conventionally used.

The silica used according to the invention can optionally be modified with linear, cyclic and/or branched silanes, silazanes, siloxane compounds and/or organosilicon compounds. The substituents can be composed, for example, of —SCN, —SH, —Cl, —NH$_2$, —OC(O)CH=CH$_2$, —OC(O)C(CH$_3$)=CH$_2$, —S, —S$_2$, —S$_3$, —S$_4$, aliphatics, olefins, aromatics, arylaromatics with or without hydroxy, amino, alkoxy, silanol, cyanide, thiocyanide, halogen, sulphonic acid, sulphonic ester, thiol, benzoic acid, benzoic ester, carboxylic acid, carboxylic ester, acrylate, methacrylate and/or organosilane radicals.

It is preferable to use bifunctional silanes, these firstly permitting coupling to the filler containing silanol groups and secondly permitting coupling to the polymer. Examples of these organosilicon compounds are:

bis(3-triethoxysilylpropyl)tetrasulphane, bis(3-triethoxysilylpropyl)disulphane, vinyltrimethoxysilane, vinyltriethoxysilane, 3-mercaptopropyltrimethoxysilane, 3-mercaptopropyltriethoxysilane, 3-aminopropyltrimethoxysilane, 3-aminopropyltriethoxysilane. Other organosilicon compounds which can be used are described in WO 99/09036, DE 10163945, DE 10223658. The content of the patent specifications mentioned is expressly incorporated by way of reference into the content of the present application. In one preferred embodiment of the invention, bis(3-triethoxysilylpropyl)polysulphane or bis(3-triethoxysilylpropyl)disulphane can be used as silane.

The term "parts" is hereinafter used for proportions by weight.

The modification of the silicon dioxide in crust form with one or more of the compounds mentioned can take place in mixtures of from 0.5 to 50 parts, based on 100 parts of precipitated silica, in particular from 1 to 15 parts and very particularly from 1 to 10 parts, based on 100 parts of silicon dioxide, where the reaction between silicon dioxide and the compounds mentioned can be carried but during preparation of the rubber mixture (in situ) or externally via spray-application and then conditioning of the silicon dioxide precoated with one or more of the compounds mentioned.

The carbon content of the modified silica can amount to from 0.1 to 20% by weight, preferably from 0.1 to 10% by weight and particularly preferably from 0.5 to 5% by weight.

According to the invention, the silicon dioxides compacted to give crusts can be used in elastomer mixing, vulcanizates, e.g. tires, among which are pneumatic tires, tire treads, cable sheathing, hoses, drive belts, conveyor belts, V-belts, roll coverings, shoe soles, gaskets and damping elements.

According to the invention, the silicon dioxides compacted to give crusts can be incorporated by mixing into elastomer mixtures, tires or vulcanizable rubber mixtures in the form of reinforcing filler in amounts of from 5 to 200 parts, based on 100 parts of rubber, either modified or else without modification.

For the purposes of the present invention, rubber mixtures and elastomer mixtures are to be considered equivalent.

Alongside mixtures in which the only fillers present are the silicon dioxide compacted to give crusts and used according to the invention with or without the organic post-treatment mentioned, the elastomer mixtures or rubber mixtures can also have been filled with one or more fillers of relatively high or relatively low reinforcing capability.

The following materials can be used as further fillers:

Carbon blacks: the carbon blacks to be used here have been prepared by the flame-black process, furnace-black process or gas-black process, and have BET surface areas of from 20 to 200 m$^2$/g, examples being SAF, ISAF, HSAF, HAF, FEF or GPF carbon blacks. The carbon blacks can also, if appropriate, contain heteroatoms, such as silicon.

Fine-particle pyrogenic silicas prepared, for example, via flame hydrolysis of silicon halides can be present in the form of mixed oxides with other metal oxides, e.g. Al, Mg, Ca, Ba, Zn and titanium oxides.

Further commercial silicas prepared in a precipitation process with BET surface areas of from 20 to 400 m$^2$/g.

Synthetic silicates, such as aluminum silicate, alkaline earth metal silicates, such as magnesium silicate or calcium silicate, with BET surface areas of from 20 to 400 m$^2$/g and primary particle diameters of from 10 to 400 nm.

Synthetic or natural aluminum oxides and the corresponding hydroxides.

Natural silicates, such as kaolin and other naturally occurring silicon dioxide compounds.

Glass fibre and glass fibre products (mats, strands) or glass microbeads.

Starch and modified types of starch.

Natural fillers, e.g. clays and siliceous chalk.

The blending ratio here depends again on the property profile to be achieved in the finished rubber mixture. A ratio of from 5 to 95% between the silicon dioxide compacted to give crusts and used according to the invention and the other abovementioned fillers (including those in the form of a mixture) is conceivable and also feasible for this purpose.

In one particularly preferred embodiment, preparation of the mixtures can use from 10 to 150 parts by weight of silicon dioxide, entirely or to some extent composed of the silicon dioxide compacted to give crusts and used according to the invention, if appropriate together with from 0 to 100 parts by weight of carbon black, or can use from 1 to 10 parts by weight of an organosilicon compound, in each case based on 100 parts by weight of rubber.

Alongside the silicon dioxide compacted according to the invention to give crusts, the organosilanes and other fillers, the polymers form a further important constituent of the rubber mixture. Mention may be made here of natural and synthetic polymers, oil-extended or not, in the form of individual polymer or blend with other rubbers, examples being natural rubbers, polybutadiene (BR), polyisoprene (IR), styrene-butadiene copolymers having styrene contents of from 1 to 60% by weight, preferably from 2 to 50% by weight (SBR) in particular prepared by means of the solution polymerization process, butyl rubbers, isobutylene-isoprene copolymers (IIR), butadiene-acrylonitrile copolymers having acrylonitrile contents of from 5 to 60% by weight, preferably from 10 to 50% by weight (NBR), partially hydrogenated or fully hydrogenated NBR rubber (HNBR), ethylene-propylene-diene copolymers (EPDM), and also mixtures of these rubbers.

The following additional rubbers can moreover be used for rubber mixtures with the rubbers mentioned: carboxy rubbers, epoxy rubbers, trans-polypenteneamer, halogenated butyl rubbers, rubbers composed of 2-chlorobutadiene, ethylene-vinyl acetate copolymers, ethylene-propylene copolymers, and, if appropriate, also chemical derivatives of natural rubber; and also modified natural rubbers.

Examples of preferred synthetic rubbers are described in W. Hofmann, "Kautschuktechnologie" [Rubber technology], Genter Verlag, Stuttgart 1980.

For production of the inventive tires, anionically polymerized S-SBR rubbers (solution SBR) whose glass transition temperature is above −50° C., and also their mixtures with diene rubbers, are of particular interest.

The method of incorporating the silicon dioxide compacted to give crusts and of preparing the mixtures comprising this silicon dioxide is conventional in the rubber industry in an internal mixer or on a roll mill preferably at from 80 to 200° C.

The inventive rubber vulcanizates can comprise the usual dosages of further rubber auxiliaries, examples being reaction accelerators, antioxidants, heat stabilizers, light stabilizers, antiozonants, processing aids, plasticizers, tackifiers, blowing agents, dyes, pigments, waxes, extenders, organic acids, retarders, metal oxides, and also activators, such as triethanolamine, polyethylene glycol and/or hexanetriol. These compounds are known in the rubber industry.

The amounts used of the rubber auxiliaries can be the known amounts which depend inter alia on the intended use. Examples of conventional amounts are amounts of from 0.1 to 50% by weight, based on rubber.

The crosslinking agents used can comprise sulphur or sulphur-donor substances, or other crosslinking systems known in the rubber industry.

The inventive rubber mixtures can moreover comprise vulcanization accelerators, used in the form of main accelerator and co-accelerator.

Examples of suitable main accelerators are mercaptobenzothiazoles, sulphenamides, thiurams, and dithiocarbamates in amounts of from 0.5 to 3% by weight.

Examples of co-accelerators are guanidines, thioureas and thiocarbamates in amounts of from 0.5 to 5% by weight. Sulphur can usually be used in amounts of from 0.1 to 10% by weight, preferably from 1 to 3% by weight, based on rubber.

The silicon dioxide compacted to give crusts and used according to the invention can be used in rubbers which are crosslinkable with accelerators and/or sulphur, or else peroxidically crosslinkable.

The vulcanization of the inventive rubber mixtures can take place at temperatures of from 100 to 200° C., preferably from 130 to 180° C., if appropriate under pressure of from 10 to 200 bar. The blending of the rubbers with the filler and, if appropriate with rubber auxiliaries and the organosilicon compound, can be carried out in/on known mixing assemblies, e.g. rolls, internal mixers and mixing extruders.

The inventive rubber mixtures are suitable for production of mouldings, e.g. for production of pneumatic tires, tire treads for summer, winter and all-year-round tires, car tires, tires for utility vehicles, motorcycle tires, tire subcomponents, cable sheathing, hoses, drive belts, conveyor belts, roll coverings, shoe soles, gasket rings and damping elements.

The inventive rubber mixtures are particularly suitable for production of car tire treads and motorcycle tire treads, but also of tires for utility vehicles with reduced rolling resistance together with good abrasion resistance and good winter performance.

The inventive rubber mixtures are moreover suitable without addition of organosilicon compounds in a blend with a typical tire-tread carbon black for improvement of the cut & chip performance of tires for construction machinery, tires for agricultural machinery and tires for mining machinery. (For definition and further details, see "New insights into the tear mechanism" and references therein, presented by Dr. W. Niedermeier at Tire Technology 2003 in Hamburg, Germany.)

The physical tests used in the following examples are shown in Table 1.

Determination of Dispersion Coefficient

Dispersion coefficient can be determined by means of a topographic method, described in: "Entwicklung eines Verfahrens zur Charakterisierung der Füllstoff-dispersion in Gummimischungen mittels einer Oberflächentopographie" [Development of a method for characterizing filler dispersion in rubber mixtures by means of surface topography] A. Wehmeier; degree thesis, 1998, at the Technical University of Münster, Steinfurt site, Chemical Engineering Department, and "Filler Dispersion Analysis by Topography Measurements" Degussa AG, Applied Technology Advanced Fillers, Technical Report TR 820.

As an alternative, dispersion coefficient can also be measured by means of the DIAS method (optically) at the Deutsches Institut für Kautschuktechnologie in Hanover, Germany (see H. Geisler, DIK aktuell, 1st edition (1997) and Medalia, Rubber Age, April 1965).

The best degree of dispersion achievable is 100%, and accordingly the worst will theoretically be 0%. Silicas whose dispersion coefficient is greater than or equal to 90% are regarded as highly dispersible (HD).

Explanation of determination of dispersion coefficient by means of surface topography:

$$\text{Dispersion coefficient} = 100\% - \frac{(\text{Total of areas underlying peaks}) \cdot 10000\% \cdot \text{Medalia factor}}{\text{Filler volume} \cdot (\text{total area tested})}\%$$

$$\text{Medalia factor} = \frac{\frac{\text{Filler volume}}{100\%}}{2} + 0.78$$

dispersion coefficient in %
total of areas underlying peaks (measure of roughness) in $mm^2$
filler volume in %
total area tested in $mm^2$

TABLE 1

| Physical test methods | |
|---|---|
| Physical testing | Standard/Conditions |
| Vulcameter testing, 165° C., 0.5° deflection MDR rheometer $M_H$ (dNm) $M_H$-$M_L$ (dNm) t 10% (min) t 90% (min) t 80%-t 20% (min) | DIN 53529/3, ISO 6502 |

TABLE 1-continued

Physical test methods

| Physical testing | Standard/Conditions |
| --- | --- |
| Ring tensile test, 23° C. | DIN 53504, ISO 37 |
| Stress value (MPa) | |
| Tensile strain at break (%) | |
| Shore A hardness, 23° C. (SH) | DIN 53 505 |
| Ball rebound (%), 60° C. | DIN EN ISO 8307, drop height 500 mm, steel ball, d = 19 mm, 28 g |
| DIN abrasion, force: 10 N (mm$^3$) | DIN 53 516 |
| Dispersion coefficient (%) | see text |
| Viscoelastic properties, Initial force 50 N and amplitude force 25 N, Conditioning time 5 min, Test value recorded after 30 s of test time Complex modulus E* (MPa) Loss factor tan δ (—) | DIN 53 513, ISO 2856 |
| Compression flexometer, 23° C. Needle temperature (° C.) Residual deformation (%) | DIN 53 533, ASTM D 623 A duration 30 min stroke 0.225 inch |

Example 1

Preparation of Br/S-SBR Rubber Mixtures and Vulcanizates Using AEROSIL® 150

General Method Specification:

The mix (green tire) used for the rubber mixtures is stated in Table 2 below. The unit "phr" here means proportions by weight, based on 100 parts by weight of the crude rubber used.

The polymer VSL 5025-1 is a solution-polymerized SBR copolymer from Bayer AG (now Lanxess Europe GmbH & Co. KG) with styrene content (by means of UV spectroscopy) of about 25% by weight (from 23% by weight to 27% by weight) and vinyl content (by means of IR spectroscopy) of about 50% by weight (from 46% by weight to 54% by weight). The copolymer comprises about 27% by weight of aromatic mineral oil (from 25.8% by weight to 28.8% by weight) and its Mooney viscosity (ASTM D1646) is about 50 MU (from 45 MU to 55 MU).

The polymer Buna CB 24 is a cis-1,4-polybutadiene (titanium type) from Bayer AG (now Lanxess Europe GmbH & Co. KG) with cis-1,4 content (by means of IR spectroscopy) of at least 96% by weight and Mooney viscosity (DIN 53523) of about 45 MU (from 39 MU to 49 MU).

TABLE 2

Green tyre mix

| Substance | phr | Name of item | Company |
| --- | --- | --- | --- |
| 1st stage | | Preparation of parent mixture | |
| Buna VSL 5025-1 | 96 | S-SBR; oil-extended (see text) | Lanxess Europe GmbH & Co. KG; 51369 Leverkusen; Germany |
| Buna CB 24 | 30 | cis-1,4-BR (see text) | Lanxess Europe GmbH & Co. KG; 51369 Leverkusen; Germany |
| Silica (sil) | 80 | | |
| X 50-S | 11.64 | Si 69 (bis(3-triethoxysilyl-propyl)tetrasulphane)/ Type N carbon black 330: 50%/50% | Degussa AG; Frankfurt am Main; Germany |
| ZnO; RS RAL 844 C | 3 | ZnO | Arnsperger Chemikalien GmbH; 50858 Cologne; Germany |
| EDENOR ST1 GS | 2 | Palmitic-stearic acid; stearin "iodine number 1" | Caldic Deutschland GmbH & Co. KG; 40231 Düsseldorf; Germany |
| Naftolen ZD | 10 | Aromatic plasticizer oil | Chemetall GmbH; 60487 Frankfurt a.M.; Germany |
| Vulkanox 4020/LG | 1.5 | N-(1,3-Dimethylbutyl)-N'-phenyl-p-phenylene-diamine (6PPD) | Rhein Chemie Rheinau GmbH; 68219 Mannheim Rheinau; Germany |
| Protektor G 3108 | 1 | Mixture of refined hydrocarbon waxes | Paramelt BV; 706875 Paramelt BV; NL 1704 RJ Heerhugowaard; Netherlands |
| 2nd stage Stage 1 batch | | Pinch/remill stage | |
| 3rd stage Stage 2 batch | | Final mixing | |
| Vulkacit D | 2 | N,N'-Diphenylguanidine (DPG) | Rhein Chemie Rheinau GmbH; 68219 Mannheim Rheinau; Germany |
| Vulkacit CZ/EG-C | 1.5 | N-Cyclohexyl-2-benzo-thiazolesulphenamide (CBS) | Rhein Chemie Rheinau GmbH; 68219 Mannheim Rheinau; Germany |
| Perkacit TBZTD-C | 0.2 | Tetrabenzylthiuram disulphide (TBzTD) | Flexsys N.V./S.A., Woluwe Garden; B-1932 St. Stevens Woluwe; Belgium |
| Ground sulphur | 1.5 | Fine-particle sulphur Ph Eur, BP | Merck KGaA; 64271 Darmstadt; Germany |

The general process for preparation of rubber mixtures and their vulcanizates is described in the following book: "Rubber Technology Handbook", W. Hofmann, Hanser Verlag 1994. Table 3 describes the mixing specification and mixing conditions for the green tire mixture used here.

TABLE 3

Mixing specification and mixing conditions for green tyre mixtures

| | |
|---|---|
| 1st stage | GK 1.5N internal mixer, fill level 0.73, 70 rpm, chamber temperature 70° C., ram pressure 5.5 bar |
| 0.0'-0.5' | Polymers |
| 0.5'-1.5' | ⅓ sil, X 50-S; purge at 1.5' |
| 1.5'-2.5' | ⅓ sil; purge at 2.5' |
| 2.5'-3.5' | ⅓ sil, remaining constituents of 1st stage; purge at 3.5' |
| 3.5'-5.0' | Mixing, if appropriate rotation rate variation required in order to achieve discharge temperature |
| 5.0' | Discharge batch (batch temperature 145° C.-155° C.) and transfer to roll system: peel milled sheet away |
| 24 h of intermediate storage at room temperature for stage 2 | |
| 2nd stage | GK 1.5N internal mixer, fill level 0.71, 80 rpm, chamber temperature 80° C., ram pressure 5.5 bar |
| 0.0'-2.0' | Plasticize stage 1 batch |
| 2.0'-5.0' | Maintain 150° C. batch temperature via rotation rate variation |
| 5.0' | Discharge batch (batch temperature 145° C.-155° C.) and transfer to roll system: peel milled sheet away |
| 4 h of intermediate storage at room temperature for stage 3 | |
| 3rd stage | GK 1.5N internal mixer, fill level 0.69, 40 rpm, chamber temperature 50° C., ram pressure 5.5 bar |
| 0.0'-2.0' | Stage 2 batch, accelerator, sulphur |
| 2.0' | Discharge batch (batch temperature 90° C.-110° C.) and transfer to roll system: cut and displace the material 3 times toward the left, 3 times toward the right, fold the material over 5 times narrow, 5 times wide, peel milled sheet away |
| 12 h of intermediate storage at room temperature prior to start of tests | |

The vulcanization time for the test specimens is in each case 17 min at 165° C. for Example 1.

Table 4 states the results of vulcanizate testing. All three samples involve AEROSIL® 150, differently post-treated: sample A is subject to preliminary bulk-density increase according to EP0280851, samples B and C have been compacted according to the invention as shown diagrammatically in FIG. 1. Starting material for sample B is sample A, and for sample C it is an AEROSIL® 150 not subject to preliminary bulk-density increase.

All three of the samples show comparable vulcanizate properties and are regarded as highly dispersible.

The according to the invention used crusts do not show any negative effect to the rubber mixtures.

TABLE 4

Results of vulcanizate testing for Example 1

| | | Green tyre Filler: AEROSIL$^R$ A 150 | Sample A Subject to preliminary bulk-density increase according to EP 0 280 851 | Sample B Inventive crusts | Sample C Inventive crusts |
|---|---|---|---|---|---|
| Tamped bulk density MDR: 165° C.; 0.5° | g/l | 121 | 282 | 249 | |
| $M_H$ | dNm | 24.0 | 24.2 | 25.0 | |
| $M_H$-$M_L$ | dNm | 20.8 | 20.9 | 21.9 | |
| t 10% | min | 0.9 | 0.8 | 0.7 | |
| t 90% | min | 4.9 | 4.9 | 5.3 | |
| t 80%-t 20% | min | 1.8 | 1.8 | 2.0 | |
| Stress value (300%) | MPa | 10.7 | 10.8 | 11.7 | |
| Tensile strain at break | % | 370 | 385 | 345 | |
| Shore A hardness | SH | 69 | 70 | 69 | |
| DIN abrasion, 10 N | mm³ | 84 | 84 | 87 | |
| Ball rebound, 23° C. | % | 30.5 | 29.2 | 29.8 | |
| Ball rebound, 60° C. | % | 55.2 | 56.5 | 56.6 | |
| Dispersion | | | | | |
| Dispersion coefficient | % | 98 | 94 | 99 | |

Example 2

Preparation of Br/S-SBR Rubber Mixtures and Vulcanizates Using Various Types of Granulated AEROSIL® Materials The mix for Example 2 corresponds to Example 1, and only the amount of X 50-S was raised, to 12.8 phr. Table 5 states the mixing specification and mixing conditions and Table 6 states the results of physical testing. The vulcanization time for the test specimens is in each case 30 min at 165° C. for Example 2.

Sample D is an AEROSIL® 200 granulated according to EP 0 725 037 A1, sample E is AEROCAT®, Degussa AG (granulated AEROSIL® 200) without any dust and sample C is described in Example 1.

Sample D exhibits a higher level of reinforcement than sample C, due to higher specific surface area. Both samples are regarded as highly dispersible, but sample D exhibits a higher level of dust contamination (cf. FIG. 4). The known sample E does not achieve the values of the two other samples either in terms of reinforcement or in terms of dispersion coefficient, it does not achieve the values of the invention, too.

TABLE 5

Mixing specification and mixing conditions for Example 2

| | |
|---|---|
| 1st stage | Brabender 350 S internal mixer, fill level 0.73, 70 rpm, chamber temperature 80° C., ram pressure 5 bar |
| 0.0'-0.5' | Polymers |
| 0.5'-1.5' | ⅓ sil, X 50-S; purge at 1.5' |
| 1.5'-2.5' | ⅓ sil; purge at 2.5' |
| 2.5'-3.5' | ⅓ sil, remaining constituents of 1st stage; purge at 3.5' |
| 3.5'-5.0' | Mixing, if appropriate rotation rate variation required in order to achieve discharge temperature |
| 5.0' | Discharge batch (batch temperature 145° C.-155° C.) and transfer to roll system: peel milled sheet away |
| 24 h of intermediate storage at room temperature for stage 2 | |
| 2nd stage | Brabender 350 S internal mixer, fill level 0.71, 80 rpm, chamber temperature 90° C., ram pressure 5 bar |
| 0.0'-2.0' | Plasticize stage 1 batch |
| 2.0'-5.0' | Maintain 150° C. batch temperature via rotation rate variation |
| 5.0' | Discharge batch (batch temperature 145° C.-155° C.) and transfer to roll system: peel milled sheet away |
| 4 h of intermediate storage at room temperature for stage 3 | |
| 3rd stage | Brabender 350 S internal mixer, fill level 0.69, 50 rpm, chamber temperature 60° C., ram pressure 5 bar |

TABLE 5-continued

| | |
|---|---|
| 0.0'-2.0' | Stage 2 batch, accelerator, sulphur |
| 2.0' | Discharge batch (batch temperature 90° C.-110° C.) and transfer to roll system: cut and displace the material 3 times toward the left, 3 times toward the right, fold the material over 5 times narrow, 5 times wide, peel milled sheet away |

12 h of intermediate storage at room temperature prior to start of tests

TABLE 6

Results of vulcanizate testing for Example 2

| | | Green tyre Filler: AEROSIL$^R$ | Sample D Granulated according to EP 0725037A1 | Sample E AEROCAT ® | Sample C Inventive crusts |
|---|---|---|---|---|---|
| Tensile strength | MPa | | 17.0 | 13.8 | 15.6 |
| Tensile strain at break | % | | 350 | 240 | 290 |
| Shore A hardness | SH | | 77 | 86 | 74 |
| DIN abrasion, 10 N | mm$^3$ | | 93 | 89 | 90 |
| Dispersion | | | | | |
| Dispersion coefficient | % | | 97 | 69 | 98 |

Example 3

Preparation of NR Rubber Mixtures and Vulcanizates Using AEROSIL® 150

The specimens from Example 1 were incorporated by mixing according to the mixing specification shown in Table 8 for the mix shown in Table 7 based on a lorry tire tread.

Table 9 collates the results of vulcanizate testing. The vulcanization time for the test specimens is in each case 40 min at 150° C. for Example 3. The powder subject to preliminary bulk-density increase and the crusts compacted according to the invention deliver comparable results. All three of the specimens are regarded as highly dispersible. The according to the invention used crusts do not have any negative effect to the rubber.

TABLE 7

Mix for natural rubber mixture for Example 3

NR

| Substance | phr | Name of item | Company |
|---|---|---|---|
| 1st stage | | Preparation of parent mixture | |
| SVR 10 | 100 | Polyisoprene | Nordmann, Rassmann GmbH 20459 Hamburg; Germany |
| Silica (sil) | 52 | | Degussa AG; Frankfurt am Main; Germany |
| Si 266 | 3.46 | Si 266 (bis(3-triethoxy-silylpropyl)disulphane) | Degussa AG; Frankfurt am Main; Germany |
| ZnO; RS RAL 844 C | 3 | ZnO | Arnsperger Chemikalien GmbH; 50858 Cologne; Germany |
| EDENOR ST1 GS | 3 | Palmitic-stearic acid; stearin "iodine number 1" | Caldic Deutschland GmbH & Co. KG; 40231 Düsseldorf; Germany |
| Vulkanox 4020/LG | 1 | N-(1,3-Dimethylbutyl)-N'-phenyl-p-phenylene-diamine (6PPD) | Rhein Chemie Rheinau GmbH; 68219 Mannheim Rheinau; Germany |
| Vulkanox HS/LG | 1 | 2,2,4-Trimethyl-1,2-dihydro-quinoline | Rhein Chemie Rheinau GmbH; 68219 Mannheim Rheinau; Germany |
| Protektor G 3108 | 1 | Mixture of refined hydrocarbon waxes | Paramelt BV; 706875 Paramelt BV; NL 1704 RJ Heerhugowaard; Netherlands |
| 2nd stage Stage 1 batch | | Pinch/remill stage | |
| 3rd stage Stage 2 batch | | Final mixing | |
| Rhenogran DPG-80 | 1.18 | 80%-N,N'-diphenyl-guanidine (DPG) | Rhein Chemie Rheinau GmbH; 68219 Mannheim Rheinau; Germany |
| Rhenogran TBBS-80 | 2 | 80%-N-tert-butyl-2-benzo-thiazolesulphenamide (TBBS) | Rhein Chemie Rheinau GmbH; 68219 Mannheim Rheinau; Germany |
| Ground sulphur | 1.5 | Fine-particle sulphur Ph Eur, BP | Merck KGaA; 64271 Darmstadt; Germany |

TABLE 8

Mixing specification and mixing conditions for Example 3

| | |
|---|---|
| 1st stage | GK 1.5N internal mixer, fill level 0.73, 45 rpm, chamber temperature 70° C., ram pressure 5.5 bar |
| 0.0'-1.0' | Polymers |
| 1.0'-2.0' | ½ sil, silane |
| 2.0'-4.0' | ½ sil, remaining constituents for stage 1 |
| 4.0' | Purge |
| 4.0'-5.0' | Mixing, if appropriate rotation rate variation required in order to achieve discharge temperature |
| 5.0' | Discharge batch (batch temperature 145° C.-155° C.) and transfer to roll system: peel milled sheet away |
| 24 h of intermediate storage at room temperature for stage 2 | |
| 2nd stage | GK 1.5N internal mixer, fill level 0.71, 70 rpm, chamber temperature 90° C., ram pressure 5.5 bar |
| 0.0'-1.0' | Plasticize stage 1 batch |
| 1.0'-3.5' | Maintain 145° C.-150° C. batch temperature via rotation rate variation |
| 3.5' | Discharge batch (batch temperature 145° C.-150° C.) and transfer to roll system: peel milled sheet away |
| 4 h of intermediate storage at room temperature for stage 3 | |
| 3rd stage | GK 1.5N internal mixer, fill level 0.69, 50 rpm, chamber temperature 70° C., ram pressure 5.5 bar |
| 0.0'-2.0' | Stage 2 batch, accelerator, sulphur |
| 2.0' | Discharge batch (batch temperature 100° C.-110° C.) and transfer to roll system: cut and displace the material 3 times toward the left, 3 times toward the right, fold the material over 5 times narrow, 5 times wide, peel milled sheet away |
| 12 h of intermediate storage at room temperature prior to start of tests | |

TABLE 9

Results of vulcanizate testing for Example 3

| Natural rubber Filler: AEROSIL® A 150 | | Sample A Subject to preliminary bulk-density increase according to EP0280851 | Sample B Inventive crusts | Sample C Inventive crusts |
|---|---|---|---|---|
| Tamped bulk density | g/l | 121 | 282 | 249 |
| MDR: 165° C.; 0.5° | | | | |
| $M_H$ | dNm | 16.8 | 17.5 | 17.2 |
| $M_H$-$M_L$ | dNm | 14.8 | 15.4 | 15.0 |
| t 10% | min | 10.2 | 11.0 | 11.0 |
| t 90% | min | 22.6 | 22.8 | 22.0 |
| t 80%-t 20% | min | 6.1 | 5.7 | 5.2 |
| Stress value (300%) | MPa | 9.2 | 8.6 | 8.5 |
| Tensile strain at break | % | 555 | 580 | 570 |
| Shore A hardness | SH | 64 | 65 | 64 |
| DIN abrasion, 10 N | mm³ | 117 | 121 | 117 |
| Dispersion | | | | |
| Dispersion coefficient | % | 98 | 98 | 98 |

Example 4

Preparation of EPDM Rubber Mixtures and Vulcanizates Using AEROSIL® R 972

Table 10 shows the mix for Example 4. Table 5 states the general mixing specification and mixing conditions and Table 6 states the results of physical testing. The vulcanization time for the test specimens is in each case 20 min at 170° C. for Example 4.

As is known to the person skilled in the art, it is impossible to comply with the mixing specification for products with low tamped bulk density and high dust generation. The powder then has to be added in a plurality of steps. Accordingly, in the case of sample G(3x) the silica was divided into five equal parts, these being added in succession. The result is that the mixing time is longer when comparison is made with the inventive crusts.

The both samples are highly dispersible. Sample G(5x) delivering somewhat lower values for tensile strength, tensile strain at break and ball rebound.

TABLE 10

Mix for EPDM rubber mixture for Example 4

EPDM

| Substance | phr | Name of item | Company |
|---|---|---|---|
| 1st stage | | Preparation of parent mixture | |
| Buna EP G 5455 | 150 | Copolymer of propene, ethene and ethylidene-norbornene (EPDM) | Rhein Chemie Rheinau GmbH; 68219 Mannheim Rheinau; Germany |
| Silica (sil) | 80 | | Degussa AG; Frankfurt am Main; Germany |
| ZnO; RS RAL 844 C | 4 | ZnO | Arnsperger Chemikalien GmbH; 50858 Cologne; Germany |
| EDENOR ST1 GS | 2 | Palmitic-stearic acid; stearin "iodine number 1" | Caldic Deutschland GmbH & Co. KG; 40231 Düsseldorf; Germany |
| Plasticizer NS | 30 | Mineral oil raffinate | Fuchs Mineralöl Eschweiler; 52249 Eschweiler; Germany |
| Vulkanox MB/MG | 1 | 2-Mercaptobenzimidazole (MBI) | Rhein Chemie Rheinau GmbH; 68219 Mannheim Rheinau; Germany |
| 2nd stage Stage 1 batch | | Final mixing | |
| Rhenocure TP/S | 2 | 67% zinc salt of a dithiophosphoric ester | Rhein Chemie Rheinau GmbH; 68219 Mannheim Rheinau; Germany |

TABLE 10-continued

Mix for EPDM rubber mixture for Example 4

EPDM

| Substance | phr | Name of item | Company |
|---|---|---|---|
| Vulkacit Mercapto C | 1 | 2-Mercaptobenzothiazole (MBT) | Bayer Material Science AG; 51358 Leverkusen; Germany |
| Vulkacit D | 1.5 | N,N'-Diphenylguanidine (DPG) | Rhein Chemie Rheinau GmbH; 68219 Mannheim Rheinau; Germany |
| Rhenogran S-80 | 2 | Sulphur/polymer binder: 80%/20% | Rhein Chemie Rheinau GmbH; 68219 Mannheim Rheinau; Germany |
| Vulkazit ZBEC | 0.8 | Zinc dibenzyl-dithiocarbamate | Rhein Chemie Rheinau GmbH; 68219 Mannheim Rheinau; Germany |

TABLE 11

Mixing specification and mixing conditions for Example 4

| 1st stage | GK 1.5N internal mixer, fill level 0.73, 60 rpm, chamber temperature 50° C., ram pressure 5.5 bar |
|---|---|
| 0.0'-1.0' | Polymers |
| 1.0'-3.0' | sil and other constituents of stage 1 |
| 3.0' | Purge |
| 3.0'-4.0' | Mixing, if appropriate rotation rate variation required, in order to achieve discharge temperature |
| 4.0' | Discharge batch (batch temperature 90° C.-130° C.) and transfer to roll system: peel milled sheet away |
| 24 h of intermediate storage at room temperature for stage 2 | |
| 2nd stage | GK 1.5N internal mixer, fill level 0.71, 50 rpm, chamber temperature 40° C., ram pressure 5.5 bar |
| 0.0'-1.0' | Stage 1 batch |
| 1.0'-2.0' | Sulphur, accelerator |
| 2.0' | Discharge batch (batch temperature 80° C.-100° C.) and transfer to roll system: fold the material over 3 times narrow, 3 times wide, peel milled sheet away |

24 h of intermediate storage at room temperature prior to start of tests

TABLE 12

Results of vulcanizate testing for Example 4

| EPDM Filler: AEROSIL® R 972 (hydrophobic) | | Sample F Inventive crusts | Sample G (5x) Subject to preliminary bulk-density increase according to EP0280851 |
|---|---|---|---|
| Tamped bulk density | g/l | 378 | 115 |
| MDR: 165° C.; 0.5° | | | |
| $M_H$ | dNm | 14.5 | 15.5 |
| $M_H$-$M_L$ | dNm | 12.1 | 12.6 |
| t 10% | min | 0.5 | 0.6 |
| t 90% | min | 9.8 | 9.9 |
| t 80%-t 20% | min | 5.3 | 5.3 |
| Tensile strength | MPa | 9.5 | 7.7 |
| Tensile strain at break | % | 650 | 580 |
| Shore A hardness | SH | 49 | 53 |
| Ball rebound, 23° C. | % | 49.2 | 48.0 |
| Dispersion | | | |
| Dispersion coefficient | % | 90 | 92 |

Example 5

Formulation

Stage 1

100 parts, 400 g, of Silopren VS silicone polymer (Bayer AG)

40 parts, 160 g, of synthetic silica 6 parts, 24 g, of VP AC 3031 silicone oil processing aid (Bayer AG)

Stage 2

0.5% of Interox DCLBP-50-PSI bis(2,4-dichlorobenzoyl) peroxide (Peroxid-Chemie GmbH)

Mixing Specification (Carried Out at Room Temperature)

Polymix 200 U two-roll mill from Schwabenthan

Roll diameter: 200 mm

Roll length: 400 mm

Nip: 0.9±0.05 mm

Rotation rate: 20 rpm, friction: 1:1.3

Stage 1

400 g of silicone polymer are added to the two-roll mill.

As soon as a homogeneous milled sheet has formed on the operator roll (faster-running roll), the filler can be added. The silica is added slowly and in portions between the two rolls. After about 50% of filler addition, the compounded material is removed from the roll by the scraper and turned.

For the formulation with processing aid, this is now added to the two-roll mill in the form of a mixture of 24 g of processing aid in about 10 g of the silica (somewhat mixed by a spatula). The remaining 50% of the amount of filler are then added.

For dispersion and homogenization of the silica, milling is continued for a further 5 min after incorporation of the filler. During the process the mixture is turned 5 more times. The mixtures thus prepared are stored for 1 week to permit continued wetting of the silica. For this purpose, the compounded materials are wrapped in PE film.

Stage 2

For plastification, the compounded material is mixed on the roll mill until a homogeneous milled sheet is produced. The previously weighed-out amount of peroxide is then administered with a spatula (made of wood or plastic). Milling is continued for a further 8 min for dispersion and homogenization of the peroxide, the scraper being used here to remove the mixture from the roll and turn it 8 times.

Storage for 24 hours at room temperature (advantageously in PE film) then again follows.

Prior to vulcanization, the compounded material is again plasticized on the two-roll mill.

Vulcanization

The heating press is preheated to: 140° C.

Silicone sheets of thickness 2 mm (pressing time 7 min) and 6 mm (pressing time 10 min) are vulcanized in the preheated press between chromed steel plates.

In order to remove cleavage products of the peroxide, the sheets are post-vulcanized at 200° C. for 6 hours in a hot-air oven. In the 1st hour the oven door is opened for 60 seconds about every 10 minutes. In the 2nd and 3rd hour, every 30 minutes. Not more than 1200 g of vulcanizates are suspended in the ovens, whose volume is 0.125 m$^3$.

TABLE 13

Dispersion coefficients for Example 5, determined by means of surface topography

| Silicone rubber Filler: AEROSIL$^R$ 200 | Sample H Inventive crusts 1st measurement | Sample H Inventive crusts 2nd measurement | Sample J Subject to preliminary bulk-density increase according to EP0280851 1st measurement | Sample J Subject to preliminary bulk-density increase according to EP0280851 2nd measurement |
|---|---|---|---|---|
| Dispersion | | | | |
| Dispersion coefficient % | 72 | 73 | 96 | 97 |

It is apparent that the inventive crusts cannot be sufficiently dispersed in silicone polymer. They have relatively high strength.

Figure 8:
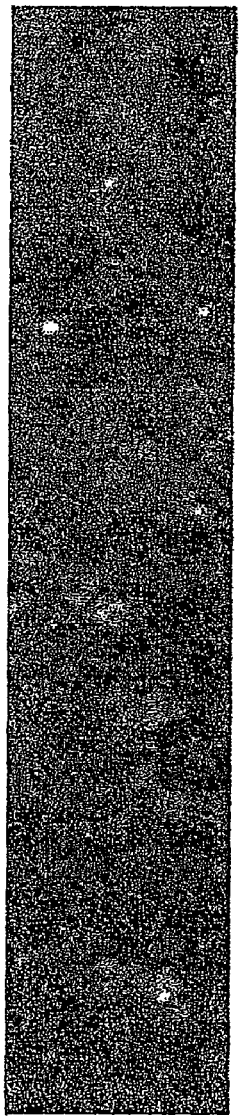
FIG. 8 shows the photographic-quality visualization of surface topography for Example 5.
Figure 8:
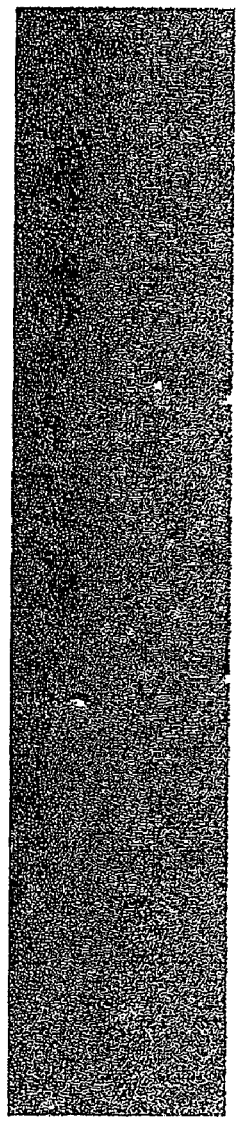

FIG. 8 shows the dispersion experiments in silicone polymer. Photographic-quality visualization of surface topography (described in: "Entwicklung eines Verfahrens zur Charakterisierung der Füllstoffdispersion in Gummimischungen mittels einer Oberflächentopographie" [Development of a method for characterizing filler dispersion in rubber mixtures by means of surface topography] A. Wehmeier; degree thesis 1998 at Münster Technology University, Steinfurt Division, Department of Chemical Engineering) for Example 5.

The invention claimed is:

1. A process for preparation of rubber mixtures comprising admixing pyrogenically prepared silicon dioxide with rubber and rubber auxiliaries, wherein the pyrogenically prepared silicon dioxide is in the form of dispersible crusts, obtained by roll compaction between two rolls, wherein compaction of the silicon dioxide results in tamped bulk density from 200 to 700 g/l (DIN EN ISO 787-11).

2. The process according to claim 1, wherein the tamped density is from 200 to 450 g/l.

3. The process according to claim 1, wherein the tamped bulk density is from 200 to 700 g/l and the pyrogenic silica is hydrophilic.

4. The process according to claim 3, wherein the tamped density from 200-450 g/l.

5. The process according to claim 1, wherein the tamped density is from 210 to 700 g/l and the pyrogenic silica is hydrophobic.

6. The process according to claim 5, wherein the tamped density is from 210 to 450 g/l.

* * * * *